United States Patent [19]

Eidsmore

[11] Patent Number: 4,705,070
[45] Date of Patent: Nov. 10, 1987

[54] ISOLATION ON/OFF VALVE

[76] Inventor: Paul G. Eidsmore, 2 Blue Hill Ct., Scotts Valley, Calif. 95066

[21] Appl. No.: 940,037

[22] Filed: Dec. 10, 1986

Related U.S. Application Data

[63] Continuation-in-part of Ser. No. 826,022, Feb. 4, 1986, which is a continuation-in-part of Ser. No. 675,825, Nov. 28, 1984, Pat. No. 4,624,443, which is a continuation-in-part of Ser. No. 398,845, Jul. 16, 1982, abandoned.

[51] Int. Cl.$^4$ .............................................. F16K 31/08
[52] U.S. Cl. .................................. 137/614.21; 251/65; 251/76
[58] Field of Search ...................... 137/614.19, 614.21; 251/65, 76

[56] References Cited

U.S. PATENT DOCUMENTS

| | | | |
|---|---|---|---|
| 2,324,642 | 7/1943 | Peterson | 251/76 X |
| 2,575,850 | 11/1951 | Swickard | 137/614.21 |
| 3,361,161 | 1/1968 | Schwartz | 251/65 X |
| 3,877,478 | 4/1975 | Longworth | 251/65 |
| 4,635,681 | 1/1987 | Boldish | 251/65 X |

Primary Examiner—Harold W. Weakley
Attorney, Agent, or Firm—Fay, Sharpe, Beall, Fagan, Minnich & McKee

[57] ABSTRACT

Fluid-flow control apparatus is disclosed by which magnetically-positionable elements within a rigid body can be externally manipulated using a controlling source of magnetic flux. The relative attractive forces which bias internal magnetic elements into normally-closed sealing engagement are substantially altered by repositioning the magnetic elements in response to the controlling magnet flux. Complete sealing or isolation against back flow through the valve under conditions of net positive outlet pressure is inhibited by the internal double-acting sealing elements which respond in unified manner to the controlling magnetic flux. Sealing surfaces on the elements are dome shaped to limit the effect of horizontal forces imposed thereon. The elements are biased into floating relation and reduced in dimension to inhibit contact with sidewalls of the valve body.

17 Claims, 7 Drawing Figures

4,705,070

ISOLATION ON/OFF VALVE

CROSS-REFERENCE TO RELATED APPLICATION

This is a continuation-in-part of copending application(s) Ser. No. 826,022 filed on Feb. 4, 1986 which is a continuation-in-part of application Ser. No. 675,825, filed Nov. 28, 1984, now U.S. Pat. No. 4,624,443 which is a continuation-in-part of application Ser. No. 398,845, 7-16-82, now abandoned.

BACKGROUND OF THE INVENTION

Fluid under pressure is commonly controlled by means of a valve that includes a valve seat and a mating element that can be controllably positioned relative to the valve seat. However, the position of the mating element relative to the valve seat within the valve is typically controlled from outside the valve with the aid of sliding or rotating seals surrounding some portion of the movable element that protrudes through the valve.

Valves for controlling toxic fluids under pressure are known to obviate sliding or rotating seals by relying upon magnetic fields externally applied to control the operation of internal valve parts. Magnetically-actuated valves of various types are disclosed in the literature (see, for example, U.S. Pats. Nos. 3,783,887; 4,331,171; 4,382,449; 4,114,852; 1,132,570; 3,877,478; 3,774,878; 3,212,751; 4,506,701; 4,350,182; 4,349,042; 4,018,419 cited in the aforementioned related application).

SUMMARY OF THE INVENTION

In accordance with the preferred embodiments of the present invention, single-acting and double-acting valve elements may be magnetically controlled from a location that is external to the valve body to provide fluid flow control and fluid system isolation without the potential hazard of sliding or rotating seals between the fluid system and the environment. The valving apparatus according to the present invention thus permits convenient control of fluids under pressure simply by manipulating the strength and orientation of an external magnetic field applied to internal magnetically-responsive valve elements. Single-acting valve operation according to one embodiment of the present invention may serve as a pressure-enhanced, normally-closed valve that can be magnetically activated to pass fluid in the downstream direction from the fluid supply. A double-acting valve according to another embodiment of the present invention may serve as a pressure-enhanced isolation valve which prevents fluid flow in both directions, for example, under conditions of excess back pressure, until magnetically activated by an external, controlling magnetic field.

DESCRIPTION OF THE DRAWINGS

FIGS. 5A and 5B are pictorial sectional views of an embodiment of the valve of FIG. 3 in which the walls of the aperture are tapered to establish different limits of fluid pressure against which the valve may be opened; and, FIG. 6 is a vertical cross sectional view of yet another embodiment of the present invention in a normally open position.

DESCRIPTION OF THE PREFERRED EMBODIMENTS

Figure 1:
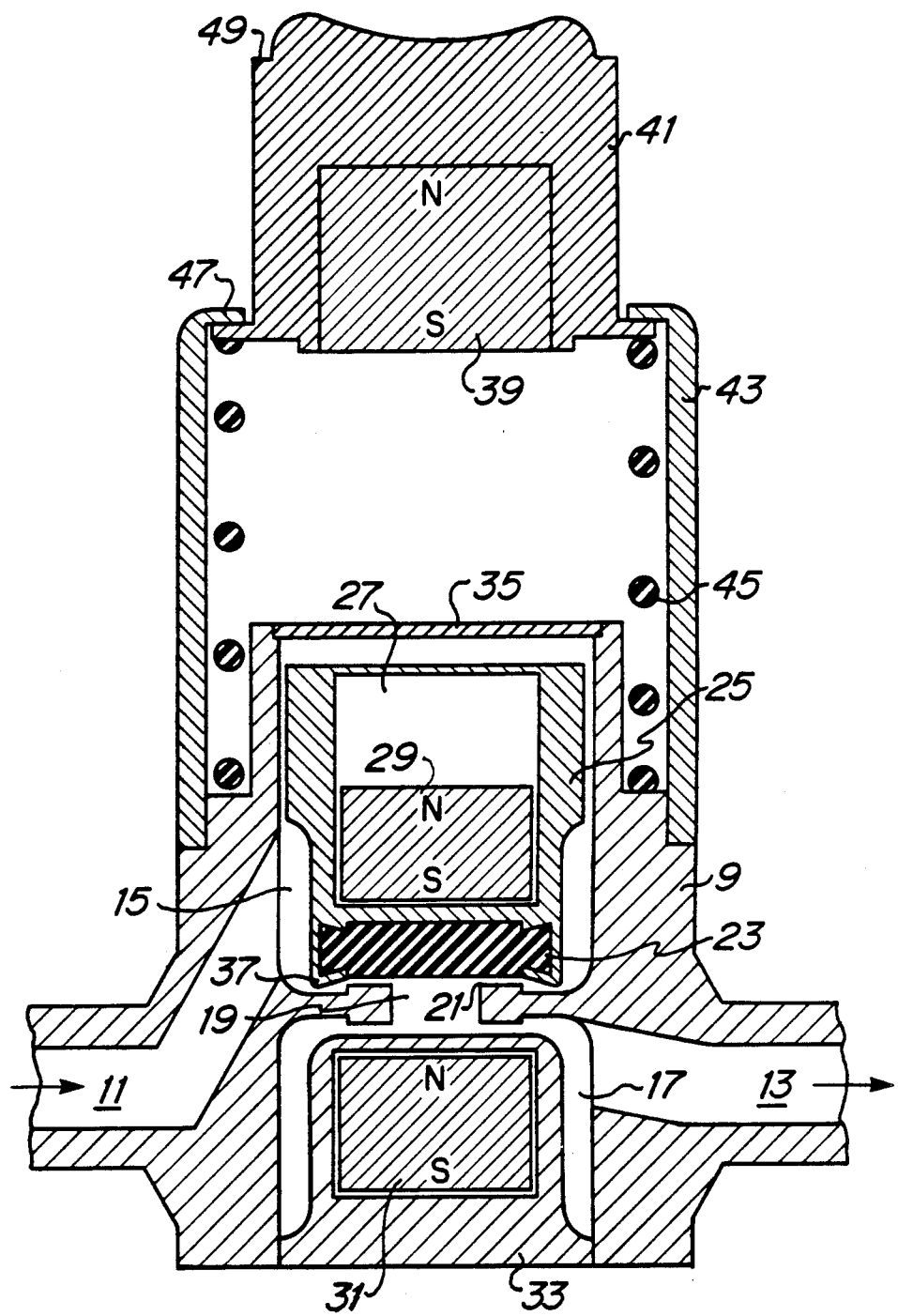
FIG. 1 is a pictorial sectional view of a generally cylindrically-shaped valve according to one embodiment of the present invention, operating in normally closed condition.

Referring now to FIG. 1, there is shown a cross-sectional view of a generally cylindrical valve in metal body 9 that includes integral fluid ports 11 and 13. Alternatively, the fluid ports 11 and 13 may be welded to body 9 using electron-beam welding techniques, or the like, to eliminate threads, flanges and other discontinuities and the associated probabilities for leaks. Each of the fluid ports 11 and 13 is coupled to an internal channel 15, 17, respectively, which are coupled to each other through aperture 19. Fluid flow through the valve is controlled by the spacing or engagement between the sealing surface 21 surrounding aperture 19 and an elastomeric valve seal 23 that is carried on movable element 25. The element 25 is generally cylindrical and is mounted for sliding movement within the fluid channel 15 in a direction that carries the valve seal 23 into or away from sealing engagement with the sealing surface 21 of the aperture 19. The element 25 includes a sealed internal, elongated cylindrical chamber 27 which contains a generally cylindrically-shaped magnet 29 that is free to slide from one end to the other within chamber 27.

Another magnet 31 may be encapsulated within the end cap 33 that is disposed in the fluid channel 17. The magnet 31 is positioned near the aperture 19 in close proximity and in attraction orientation to the magnet 29. The end cap 33 may be sealed to the lower end of body 9 and an end plate 35 may be sealed to upper end of body 9 using electron-beam welding techniques, or the like, to avoid joints that may leak. Thus, the valve body 9 and associated elements 11, 13, 33, and 35 may all be formed of stainless steel, aluminum, plastic, or other suitable non-magnetic material that may also be beam welded or otherwise sealed against leaks.

The valve embodiment illustrated in FIG. 1 operates in normally-closed mode due to the magnetic attraction between magnets 29 and 31 that carries the elastomeric seal 23 of element 25 into sealing engagement with the sealing surface 21 of body 9 that surrounds the aperture 19. The seal 23 may be formed as a wafer of perfluoroelastomer (available commercially as Kalrez, from Du Pont Co.), or other suitable chemically inert material, and may be molded or encapsulated on the end of element by 25 cold-rolling a flange 37 inwardly upon the wafer 23, as shown. With fluid applied under pressure to channel 15 via fluid port 11, the fluid seal formed by and between seal 23 and surface 21 is enhanced by the pressure differential between channels 15 and 17 acting on the cross sectional area of aperture 19. This pressure-enhanced sealing force and the magnetic-attractive sealing force must be overcome in order to open the valve to permit fluid flow therethrough.

Figure 2:
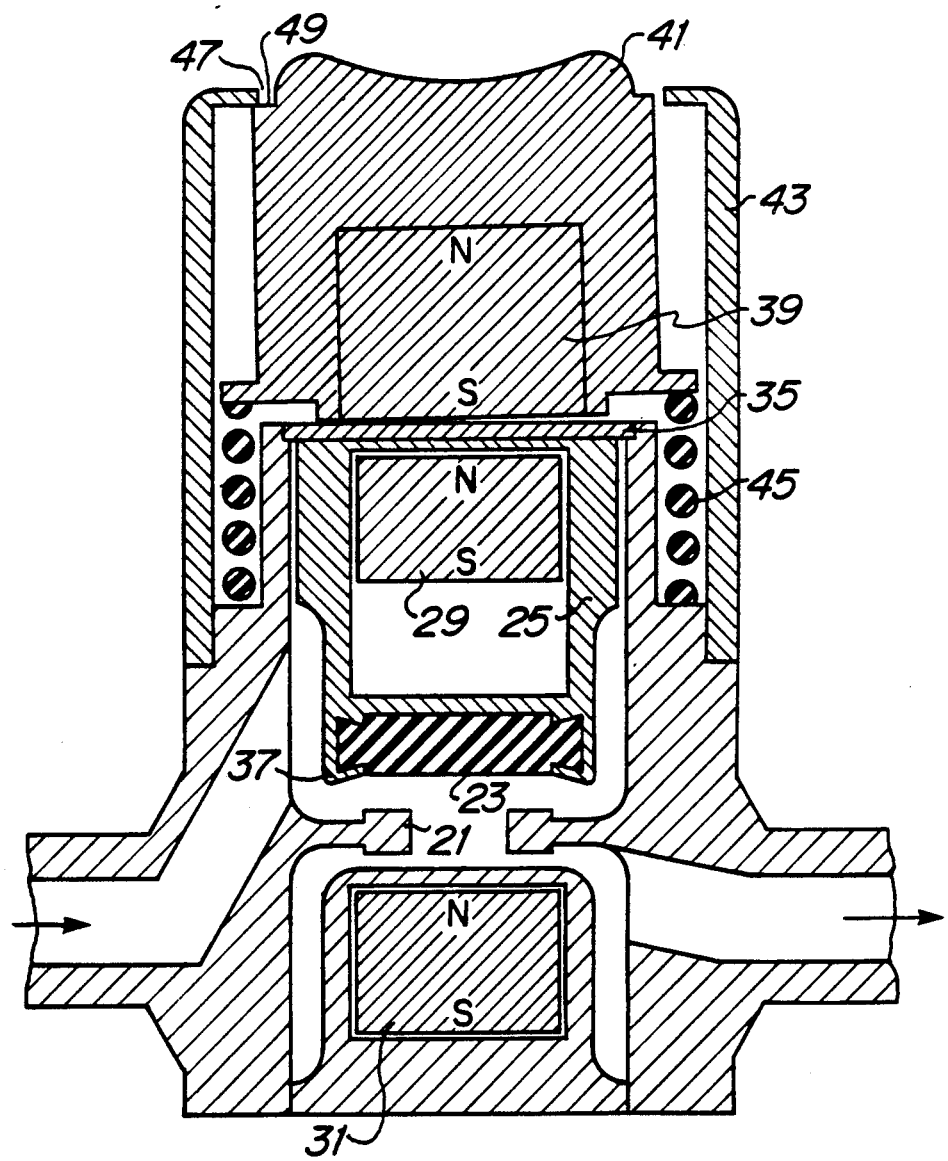
FIG. 2 is a pictorial sectional view of the embodiment of FIG. 1 shown operating in the actuated or open mode to pass fluid under pressure.

Referring now to FIG. 2, there is shown the valve embodiment of FIG. 1 operating in the open position under control of an external magnetic actuator 30. This magnet 39 provides the controlling magnetic flux and is encapsulated within a manually-depressable push button 41. The push button 41 is captivated on the outside of valve body 9 by the cylindrical guide 43 and is biased by spring 45 to the distal or inactive position illustrated in FIG. 1. Magnet 39 is shown as being generally larger than the magnet 29, but it should be understood that the magnetic flux from the magnet 39 should be sufficient to attract magnet 29 away from its lower position within chamber 27 in close proximity to magnet 31 (thus sealing the aperture 19) to its upper position within chamber 27 in close proximity to magnet 39. In this upper position, the element 25 with seal 23 is moved upwardly and away from sealing surface 21 to open the aperture 19 for fluid flow therethrough. Also with magnet 29 in this upper position, its attraction to magnet 31 is substantially reduced so that magnet 39 maintains control over valve operation for as long as it is positioned close to end plate 35. The push button 41 that carries magnet 39 may be "latched" in this control position by the inward flange 47 of the guide 43 engaged with shoulder 49 near the top of the button 41. Of course, it should be understood that means other than magnet 39 in push button 41 may be used to control the valve. For example, an electromagnet may be attached to the valve body in known manner to selectively establish the requisite attractive magnetic field under electrical control. Similarly, an air-operated plunger may be attached to the valve body 9 and to the magnet 39 in known manner to selectively position the magnet 39 close to end plate 35 under pneumatic control. Thus, fluid flow through this embodiment of the valve of the present invention is controlled externally by magnetically attracting the relatively-movable sealing elements into sealing engagement, and by repositioning a movable magnet carried by a sealing element away from its one position of sealing engagement (by its closely-spaced attraction to a biasing magnet) to another position that is closely adjacent an attractive, controlling magnet and that is substantially spaced from the biasing magnet.

Figure 3:
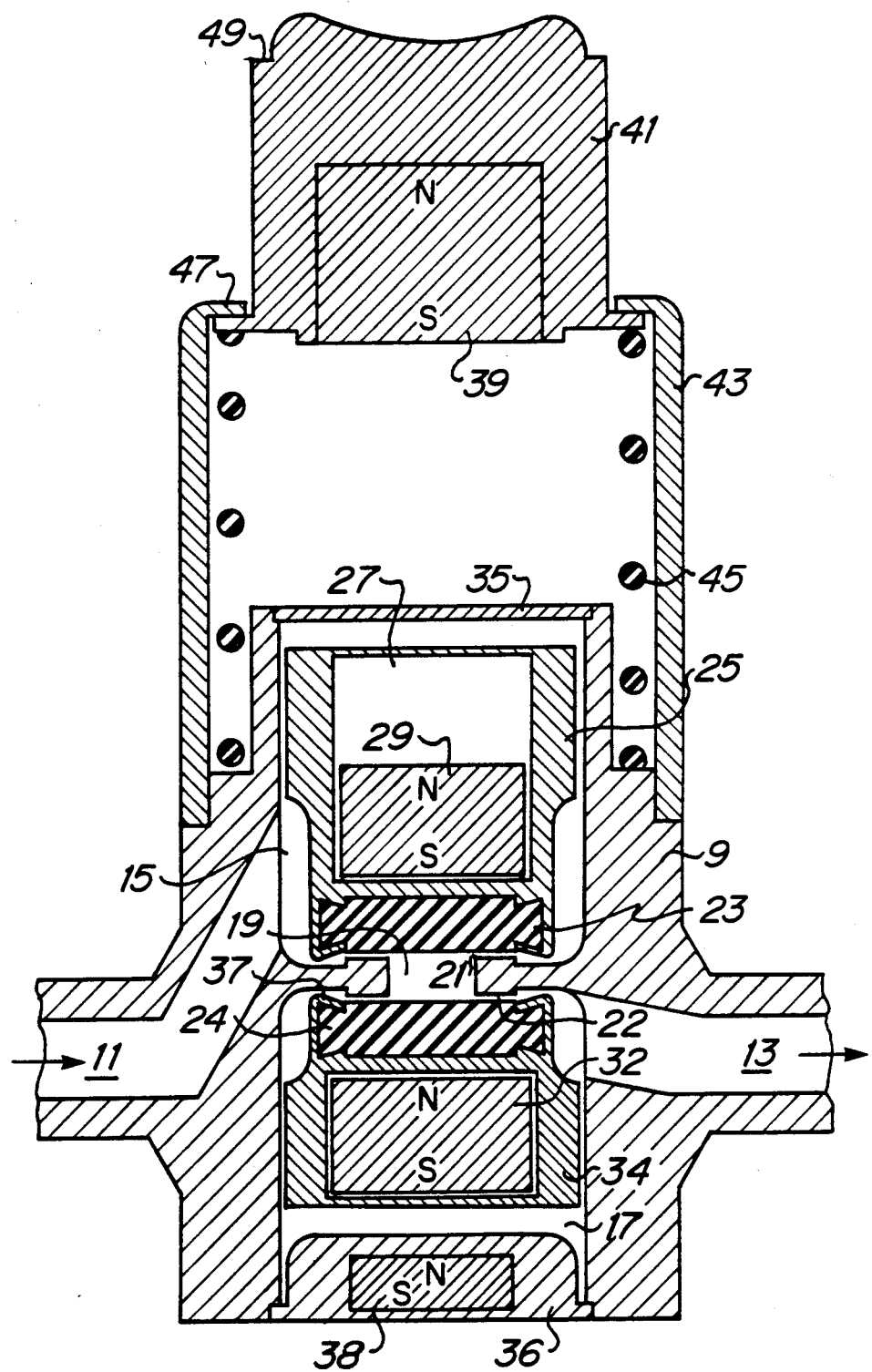
FIG. 3 is a pictorial sectional view of another embodiment of the present invention similar to the embodiment of FIG. 1 which provides seal against bidirectional fluid flow in normally closed operation.

In certain fluid-flow controlling applications of the present invention, it is important to ensure that back pressure on the outlet side of the valve cannot overcome the magnetically-enhanced, pressure-enhanced seal and force fluid back through the valve. In such applications, it is advantageous to seal both inlet and outlet sides of the valve aperture 19 according to another embodiment of the present invention, as illustrated in FIG. 3. In that FIGURE, the elements which are similar to elements illustrated in FIG. 1 bear the same legends. It should be noted that, in the illustrated embodiment of FIG. 3, a magnet 32 (for attracting the magnet 29 carried in element 25 into sealing engagement) is itself encapsulated in a movable sealing element 34 which includes an elastomeric seal 24. Thus, with the magnets 29 and 32 disposed in attractive orientation and carried by their respective sealing elements 25 and 34, the aperture 19 sealed from both sides by seal 23 engaging the surrounding upper surface 21 and by seal 24 engaging the surrounding lower surface 22. These magnetically-enhanced seals are enhanced further by net fluid pressure in channel 15 (which enhances seal 21, 23) or by net fluid pressure in channel 17 (which enhances seal 22, 24), thereby assuring complete isolation between the fluid ports and channels that couple to aperture 19. Another magnet 38 (shown smaller to depict a source of relatively lower-level magnetic flux) is encapsulated within the end cap 36 in attractive orientation to magnet 32, and the end cap 36 is beam welded to body 9, as discussed previously, to eliminate joints and the possibility of leaks. The magnet 38 of lower-level flux is thus incapable of overcoming the attractive force between magnets 29 and 32 that bias the seals closed, and the valve operates normally closed, as described above.

Figure 4:
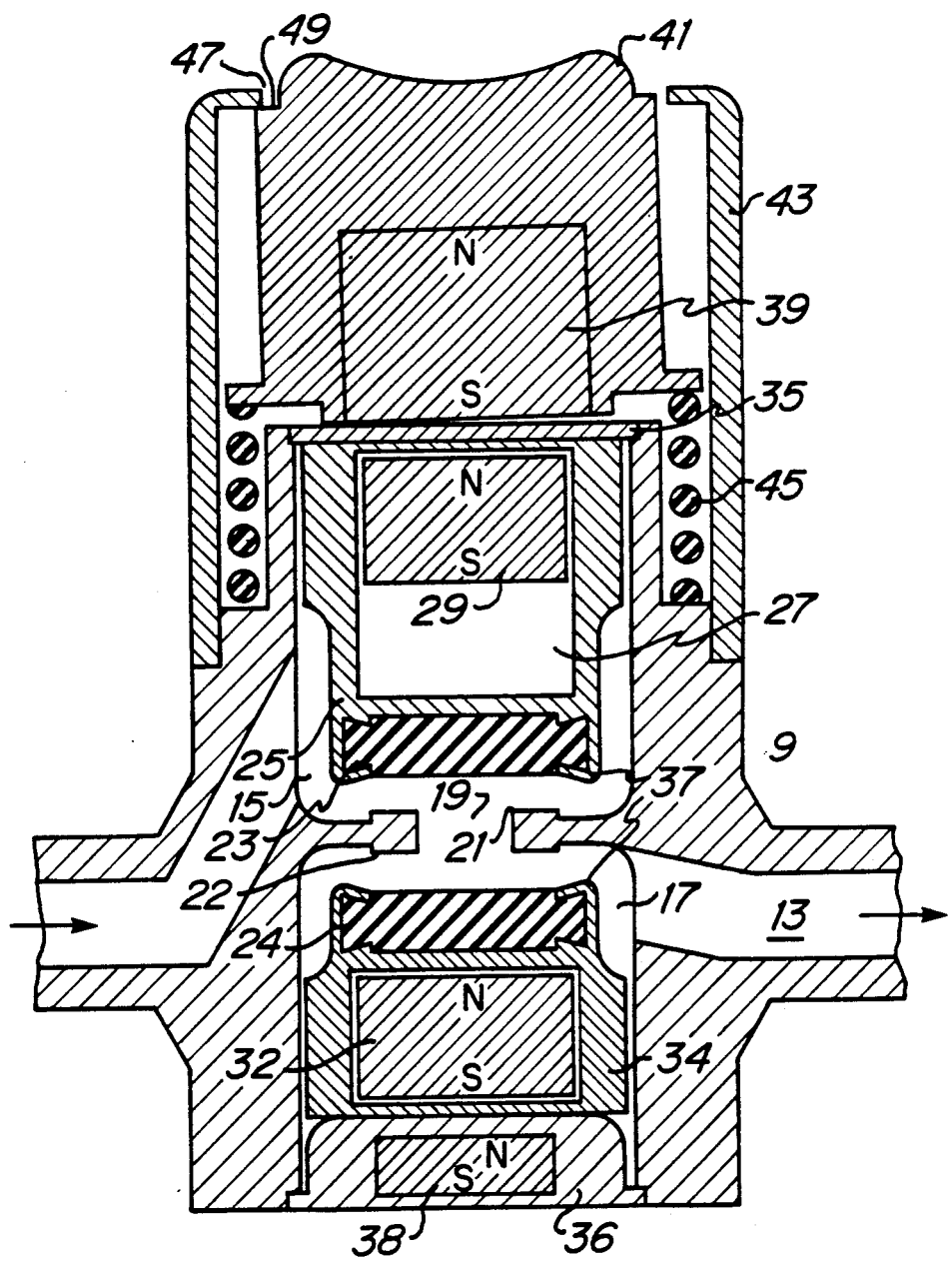
FIG. 4 is a pictorial sectional view of the embodiment of FIG. 3 shown operating in the actuated or open mode to pass fluid under pressure.

Referring now to FIG. 4, there is shown the valve embodiment of FIG. 3 actuated to open the aperture 19 according to the present invention. Specifically, the magnetic attraction between magnets 29 and 39 (when magnet 39 is repositioned, upon actuation of button 41, into close proximity with the end plate 35), repositions the magnet 29 to the upper position within chamber 27 and carries element 25 and seal 23 away from engagement with sealing surface 21. This repositioning of magnet 29 away from magnet 32 substantially reduces the attractive force therebetween, and magnet 32 is attracted with greater net force toward magnet 38. Element 34 which carries the magnet 32 and seal 24 is thus slidably repositioned away from sealing engagement between seal 24 and surface 22, and in close proximity to magnet 38.

The valve continues to operate in the open mode, as illustrated, under the control of magnetic flux from magnet 39. Once magnet 39 is repositioned remotely from end plate 35 (or the magnetic flux of an equivalent electromagnet is decreased), the net attractive force between magnets 29 and 32 is again restored, the magnet 29 is repositioned within chamber 27 closely adjacent the aperture, and the respective elements 25, 34, and seals 23, 24 are repositioned against both sealing surfaces 21, 22 of aperture 19. The attractive force between magnets 38 and 32 is reduced and is overcome by the attractive force between magnets 29 and 32 to restore the valve to normally-closed operation, as illustrated in FIG. 3. Thus, fluid flow through this embodiment of the valve of the present invention is further controlled by repositioning movable, attractive magnets carried by movable sealing elements disposed on each side of an aperture away from their respective positions of sealing engagement with the aperture, to other positions of their respective elements away from sealing engagements with the aperture and closely proximate other respective attracting magnets.

Figure 5A:
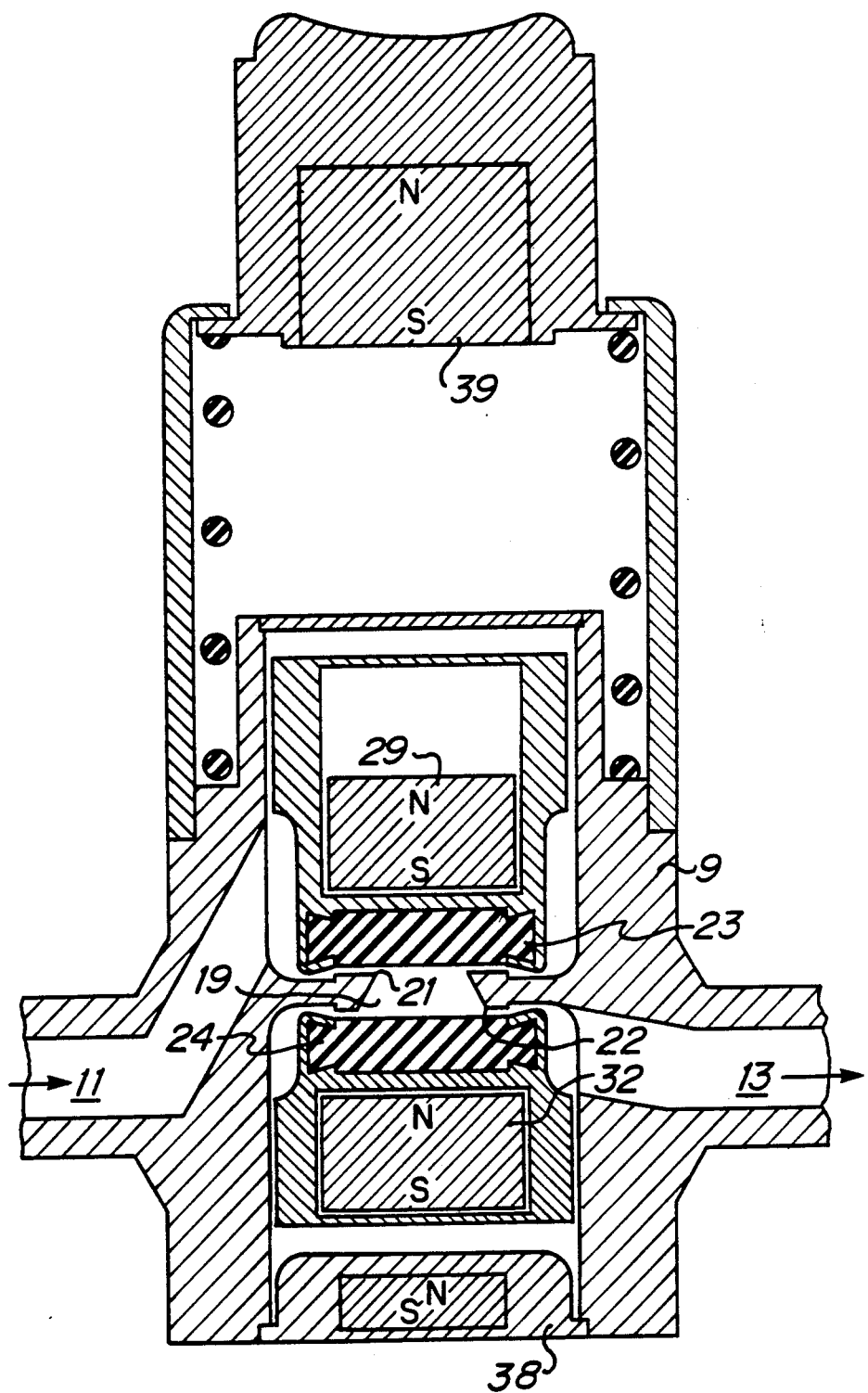

It should be noted that the valve of the present invention assures a margin of safety against opening under conditions of overpressurization of the fluid supply. The pressure-enhanced seal against fluid flow, as previously described, and the limited magnetic force that is available internally to actuate the elements 25 and 34 establish a maximum pressure above which the valve cannot be opened. This is particularly important if the valve is placed in a system upstream of a glass of quartz vessel (as is common in semiconductor manufacturing systems) which may rupture or be damaged by excessive fluid pressure. Thus, in contrast to conventional valves which may be forced open under manual control, or by sufficient air pressure or electromagnetic force applied to the valve, operation of the present valve in overpressure supply conditions remains immune to externally-applied forces that might be imprudently applied to force it open. Pushing down harder upon the button 49 does not apply more force to open the valve than can be provided by the magnetic attraction of magnets 29 and 39. The force available from these magnets can thus only overcome a certain limited supply of fluid pressure acting upon the effective area of the aperture. For a larger aperture and the same magnets 29 and 39, only a lower level of supply pressure can be overcome to open the valve. Referring, therefore, to FIGS. 5a and 5b, there is shown a a sectional view of another embodiment of the valve of FIGS. 3 and 4 in which the walls of the aperture 19 are tapered so that the valve-seat surfaces 21 and 22 provide different areas over which the inlet pressure and outlet pressure, or back pressure, operate. In accordance with this feature of the present invention, the valve may be designed to open on the inlet side against a relatively high supply pressure while the outlet side may only be opened against the outlet or back pressure or lower level.

Figure 6:
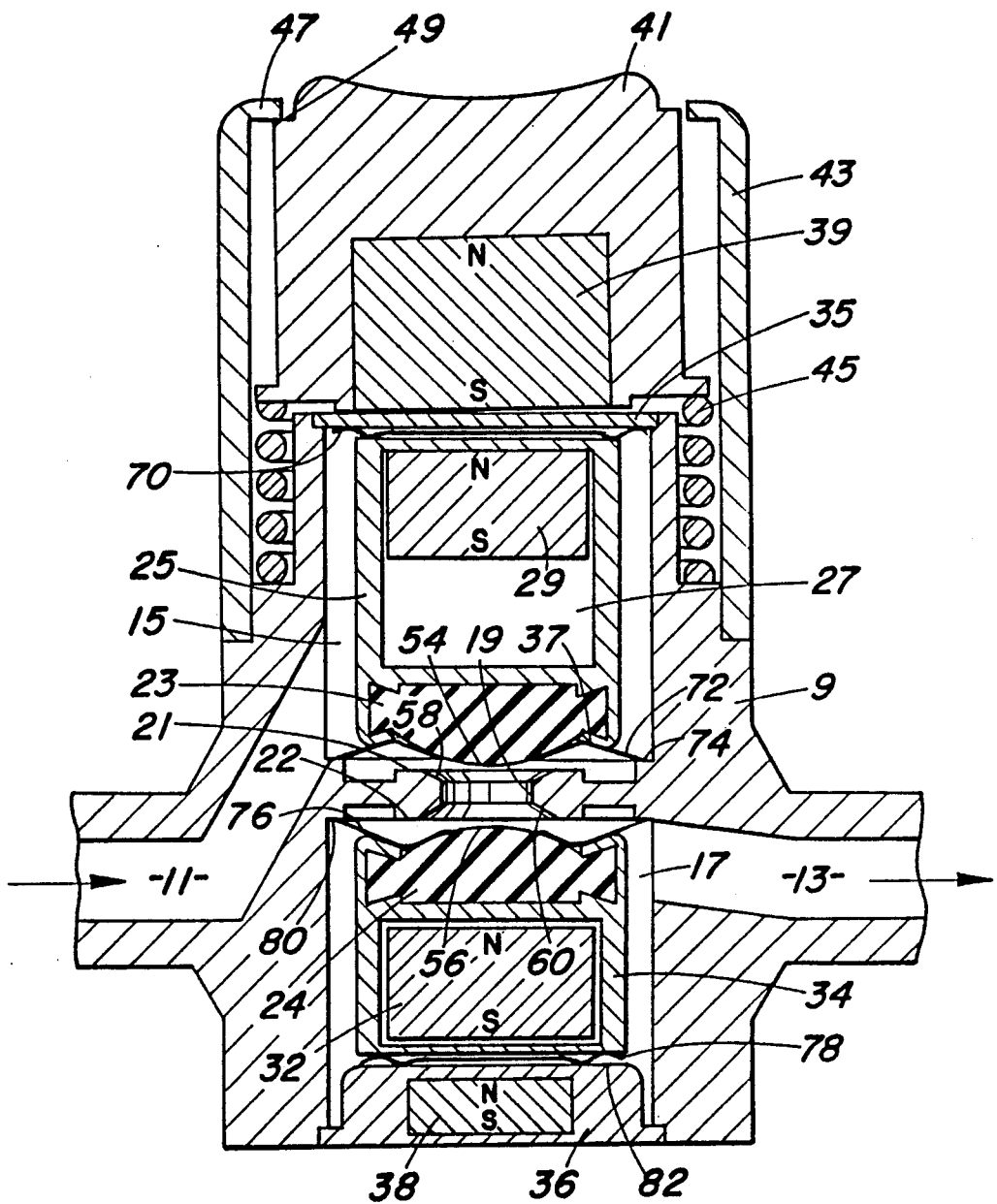

According to the embodiment illustrated in FIG. 6, the seals 23 and 24 are modified to limit lateral shifting of the seals relative to modified sealing surfaces 21, 22. More particularly, each seal 23, 24 includes an outwardly facing spherical button or dome-shaped surface 54, 56, respectively. These dome-shaped surfaces 54, 56 are preferably received in modified sealing surfaces 21, 22. As shown, the sealing surfaces include frusto-conical recesses 58, 60 closely surrounding the aperture 19. Modification of the seals and sealing surfaces in this manner assures a tight sealing relationship therebetween and limits the effect of horizontal forces that may otherwise tend to dislodge the seal from its associated sealing surface.

Additionally, use of the valve in ultra-clean environments where containments must be closely controlled is enhanced by altering the construction of movable element 25 and sealing element 34. As is apparent in the embodiment of FIGS. 3-4, the elements 25, 34 are closely spaced with the sidewalls of channels 15, 17. That type of construction is subject to intermittent contact and rubbing between the elements and sidewalls which, in turn, promote formation of minute particles that could contaminate the fluid. In an effort to inhibit contact with the sidewalls, the elements 25, 34 in the FIG. 6 embodiment are reduced in lateral dimension. This dimensional reduction defines an annular gap between the elements and sidewalls that drastically reduces the potential for any contact.

To maintain the vertical and horizontal alignment of the movable element 25 a pair of opposed biasing means such as springs 70, 72 are used. The first or upper spring 70 is interposed between the end plate 35 and movable element 25. Preferably a portion of the spring 70 is welded into the joint defined by the end plate 35 and valve body. Another portion of the spring is spot welded to the element 25. Similarly, the second or lower spring 72 is received on a radially extending shoulder 74 in channel 15 and spot welded to the movable element 25 along flange 37. The movable element is thus biased in floating relation in the channel. Contact between the element and end plate is prevented while tight engagement with sealing surface 21 is maintained in the valve closed position.

The sealing element 34 is, likewise, biased at opposed upper and lower ends by springs 76, 78. The spring 76 is spot welded to the element along flange 37 and engages the radially extending wall 80 of channel 17. On the other hand, the spring 78 is interposed between the end cap 36 and face 82 of the sealing element. This arrangement also maintains the sealing element 34 in floating relationship in channel 17 but does not interfere with sealing contact between dome-shaped surface 56 and the sealing surface 22. In all other respects, the valve arrangement of FIG. 6 functions comparably to the embodiment of FIGS. 3-4.

Therefore, the fluid flow isolation and control apparatus according to the present invention provides reliable normally closed operation which can be controlled externally by magnetic means without need for sliding seals or bellows between internal fluid channels and the environment. In addition, the integrity against back flow through the valve can be preserved according to the present invention by providing double-acting sealing elements on both sides of an aperture under the unified control of a single source of magnetic flux.

Having thus described the invention, what is claimed is:

1. A valve comprising:
   a valve body having a fluid inlet and fluid outlet in selective communication with one another through an aperture;
   a first channel operatively associated with one of said fluid inlet and fluid outlet on a first side of said aperture;
   a second channel operatively associated with the other of said fluid inlet and fluid outlet on a second side of said aperture;
   a first valve member received in said first channel, said first valve member including a seal face having an outwardly extending generally domed surface adapted for selective closing engagement with said aperture;
   a chamber having a first predetermined dimension defined in said first valve member;
   a first magnet of a second predetermined dimension received in said chamber, said second dimension being substantially less than said first dimension such that said first magnet can move within said chamber between first and second positions corresponding to open and closed positions of said first valve member;
   a second magnet disposed in said second channel magnetically urging said first magnet to one of said first and second positions; and,
   magnet means remotely disposed from said first and second channels for magnetically urging said first magnet to the other of said first and second positions.

2. The valve as defined in claim 1 further comprising a generally frusto-conical region adjacent said aperture for receiving said domed surface in the valve closed position.

3. The valve as defined in claim 1 further comprising means for biasing said first valve member into floating relation in said first channel.

4. The valve as defined in claim 3 wherein said biasing means includes first and second springs operatively engaging opposed ends of said first valve member.

5. The valve as defined in claim 1 further comprising a second valve member disposed in said second channel having a seal face adapted for selective closing relation with said aperture, said second magnet being disposed in said second valve member.

6. The valve as defined in claim 5 wherein said seal face of said second valve member has an outwardly extending generally domed surface.

7. The valve as defined in claim 6 further comprising a generally frusto-conical region adjacent said aperture for receiving said domed surface of said second valve member in the valve closed position.

8. The valve as defined in claim 5 further comprising second means for biasing said second valve member into floating relation in said second channel.

9. The valve as defined in claim 8 wherein said second biasing means includes first and second springs operatively engaging opposed ends of said second valve member.

10. The valve as defined in claim 9 further comprising a third magnet urging said second magnet away from the magnetic influence of said first magnet.

11. A valve comprising:
a valve body having first and second fluid passages being selectively communicated through an aperture;
a first valve member disposed in a first channel in said body, said first valve member having a surface for selectively sealing said aperture;
a chamber having a first predetermined dimension defined in said first valve member;
a first magnet having a second predetermined dimension substantially less than said first dimension and being received in said chamber for movement between first and second positions at opposed ends of said chamber associated with first valve member open and closed positions;
means for biasing said first valve member into floating relation in said first channel for limiting contact therewith;
a second magnet disposed in a second channel on the opposite side of said aperture from said first channel, said second magnet urging said first valve member toward one of said open and closed positions; and,
means for magnetically attracting said first valve member to the other of said open and closed positions.

12. The valve as defined in claim 11 wherein said biasing means includes first and second springs disposed on opposite ends of said first valve member.

13. The valve as defined in claim 11 wherein said first valve member surface has a domed configuration selectively cooperating with a generally frusto-conical region adjacent said aperture.

14. The valve as defined in claim 11 further comprising a second valve member receiving said second magnet and including a surface for sealing said aperture.

15. The valve as defined in claim 14 wherein said second valve member surface has a domed configuration selectively cooperating with a generally frusto-conical region adjacent said aperture.

16. The valve as defined in claim 15 further comprising second means for biasing said second valve member in floating relation in said second channel.

17. The valve as defined in claim 11 further comprising a third magnet urging said second magnet toward a valve open position.

* * * * *